(12) United States Patent
Thienel et al.

(10) Patent No.: US 11,904,668 B2
(45) Date of Patent: Feb. 20, 2024

(54) VEHICLE DOOR ASSEMBLY WITH AN ORGANOSHEET DOOR MODULE CARRIER REINFORCING A SILL REGION

(71) Applicant: Brose Fahrzeugteile SE & Co. Kommanditgesellschaft, Bamberg, Bamberg (DE)

(72) Inventors: Michael Thienel, Thurnau (DE); Andre Carl, Coburg (DE); Dominik Hofmann, Baunach (DE); Siegfried Ordosch, Bamberg (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 226 days.

(21) Appl. No.: 17/425,370

(22) PCT Filed: Jan. 24, 2020

(86) PCT No.: PCT/EP2020/051712
§ 371 (c)(1),
(2) Date: Nov. 29, 2021

(87) PCT Pub. No.: WO2020/152310
PCT Pub. Date: Jul. 30, 2020

(65) Prior Publication Data
US 2022/0097498 A1 Mar. 31, 2022

(30) Foreign Application Priority Data
Jan. 25, 2019 (DE) .................... 10 2019 200 977.8

(51) Int. Cl.
*B60J 5/04* (2006.01)
(52) U.S. Cl.
CPC ........... *B60J 5/0455* (2013.01); *B60J 5/0416* (2013.01); *B60J 5/0426* (2013.01); *B60J 5/0481* (2013.01)

(58) Field of Classification Search
CPC ...... B60J 5/0455; B60J 5/0416; B60J 5/0426; B60J 5/0481; B60J 5/0484; B60J 5/0413; B60J 5/045
See application file for complete search history.

(56) References Cited

U.S. PATENT DOCUMENTS

| | | | |
|---|---|---|---|
| 4,843,762 A | 7/1989 | Grier et al. | |
| 5,308,138 A * | 5/1994 | Hlavaty | ............. B60R 21/0428 49/502 |

(Continued)

FOREIGN PATENT DOCUMENTS

| | | |
|---|---|---|
| AT | 004671 U1 | 10/2001 |
| CN | 101405158 A | 4/2009 |

(Continued)

OTHER PUBLICATIONS

Chinese Office Action for Application No. 202080010390.4, dated Mar. 31, 2023, English Translation attached to original, All together 16 Pages.

*Primary Examiner* — Jason S Morrow
(74) *Attorney, Agent, or Firm* — Dickinson Wright PLLC

(57) ABSTRACT

A vehicle door assembly, having a first frame component including a window frame for a window opening and two opposing lateral frame for defining a frame cut-out and forming a sill portion connecting the two lateral frame portions to one another, a second frame component for strengthening the window frame, the second frame component fixed on the first frame component, and a door module carrier formed from an organosheet and at least partially closes the frame cut-out. The door module carrier forming an edge portion fixed to the sill portion in a longitudinal direction of the sill portion. The organosheet is a supporting structural component and an edge portion thereof is reinforced by a reinforcing structure injection-moulded onto the organosheet and the edge portion thereof strengthens the sill (Continued)

portion of the first frame component where no portion of the second frame component is provided.

12 Claims, 11 Drawing Sheets

(56) References Cited

U.S. PATENT DOCUMENTS

| | | | | |
|---|---|---|---|---|
| 6,536,164 | B1* | 3/2003 | Kirejczyk | B60R 13/02 49/502 |
| 10,603,990 | B2* | 3/2020 | Hümmer | B60J 5/0455 |
| 10,960,737 | B2* | 3/2021 | Jeon | B60J 5/048 |
| 11,065,944 | B2* | 7/2021 | Jeon | B60J 5/0413 |
| 11,148,511 | B2* | 10/2021 | Plentis | B60J 5/0426 |
| 2006/0196122 | A1* | 9/2006 | Urieta | E05F 11/483 49/502 |
| 2011/0254311 | A1 | 10/2011 | Dajek et al. | |
| 2016/0207238 | A1* | 7/2016 | Habraken | C08J 5/10 |
| 2017/0210210 | A1 | 7/2017 | Ange | |
| 2018/0056760 | A1* | 3/2018 | Hümmer | B60J 5/0455 |
| 2021/0162841 | A1* | 6/2021 | Staser | B60R 13/0243 |
| 2021/0162846 | A1* | 6/2021 | Carl | B60J 5/0426 |
| 2021/0347234 | A1* | 11/2021 | Thienel | B60J 5/0463 |
| 2023/0012965 | A1* | 1/2023 | Siggia | B29C 70/763 |

FOREIGN PATENT DOCUMENTS

| | | |
|---|---|---|
| CN | 102235143 A | 11/2011 |
| CN | 107009854 A | 8/2017 |
| CN | 107225943 A | 10/2017 |
| DE | 3879586 T2 | 9/1993 |
| DE | 19942650 A1 | 3/2001 |
| DE | 102011111232 A1 | 2/2013 |
| DE | 102012023588 A1 | 7/2013 |
| DE | 102013213711 A1 | 1/2015 |
| DE | 202016008222 U1 | 6/2017 |
| DE | 102016100947 A1 | 7/2017 |
| DE | 102017002640 A1 | 9/2017 |
| FR | 2236678 A1 | 2/1975 |
| WO | 2007111782 A1 | 10/2007 |
| WO | 2015104471 A1 | 7/2015 |
| WO | 2016177711 A1 | 11/2016 |

* cited by examiner

VEHICLE DOOR ASSEMBLY WITH AN ORGANOSHEET DOOR MODULE CARRIER REINFORCING A SILL REGION

CROSS-REFERENCE TO RELATED APPLICATIONS

This application is the U.S. National Phase of PCT Application No. PCT/EP2020/051712 filed on Jan. 24, 2020, which claims priority to German Patent Application No. DE 10 2019 200 977.8, filed on Jan. 25, 2019, the disclosures of which are hereby incorporated in their entirety by reference herein.

TECHNICAL FIELD

The present disclosure relates to a vehicle door assembly.

BACKGROUND

A generic vehicle door assembly has a first frame component as part of a door shell, the first frame component comprising a window frame for a window opening and two mutually opposite lateral frame sections for definition of a frame cutout. The window opening and the frame cutout are separated from one another by a longitudinally running sill section which connects the two lateral frame sections of the first frame component. In the assembled state of the vehicle door assembly, a sill region of the vehicle door is provided on the sill section. In practice, in order to reinforce the window frame, that is to say the region above the sill section, and the sill region, a second frame component is provided as a window frame reinforcement and is fixed to the first frame component. Here, the second frame component typically also extends along the sill section in order to stiffen the latter.

SUMMARY

Proceeding from this, the present disclosure may be based on the object of further improving a vehicle door assembly.

Here, a proposed vehicle door assembly provides that the door module carrier formed with organosheet is configured in the form of a load-bearing structural component and for this purpose is stiffened on its edge section by at least one stiffening structure injection-molded on the organosheet, and by way of its edge section reinforces the sill section of the first frame component in a continuous region in which no section of the second frame component is provided.

In one or more embodiments, an edge section, close to the sill and where the fixing to the first frame component is also effected, the door module carrier, which is formed to a substantial extent by organosheet, is stiffened, and has a stiffening effect, such that the door module carrier becomes a load-bearing constituent part of the vehicle door. What is achieved here by the targeted stiffening of the door module carrier formed with fiber-reinforced, such as, continuous-fiber-reinforced plastics material is that along with a comparatively low weight the door module carrier has a mechanical stiffness which is increased in a targeted manner in such a way that an additional reinforcement of the sill section by a second frame component may be omitted. This also makes it possible to enlarge the frame cutout considerably compared with previously known constructions. It is thus also possible for the frame cutout for the door module carrier to be bordered in an encircling manner at the periphery merely by comparatively narrow sections of the door shell. In the assembled state, the assembled door module carrier then for example spans more than 85%, in particular more than 90%, of the area defined below the window opening by the door shell.

Here, formation of the door module carrier with an organosheet means that the door module carrier is formed to a substantial extent by organosheet. The door module carrier extends in this case along a main plane. For example, functional elements, such as for example functional elements of a window regulator or of a door lock, are fixed to a door module carrier. The door module carrier may be formed here, for example, by a plate-like semifinished product which is composed of an organosheet. The organosheet is for example a continuous-fiber-reinforced thermoplastic in which continuous fibers in the form of laid scrims, woven fabrics or knitted fabrics composed of glass fibers, Kevlar® fibers, carbon fibers or synthetic fibers are embedded in a thermoplastic matrix. A suitable thermoplastic for the matrix is for example polyamide or polypropylene. The expression "continuous-fiber-reinforced" is to be understood to mean that the length of the fibers used for reinforcement is limited substantially by the size of the plate-like organosheet. A fiber is thus generally not interrupted within the organosheet.

The fact that the door module carrier is formed to a substantial extent by organosheet also means in this case that the organosheet forms that part of the door module carrier which is subjected to the majority of the forces occurring under normal operating conditions. A part (which for example bears one or more guide rails and is coherent) of the door module carrier composed of organosheet or a plurality of parts (which for example bear one or more guide rails) of the door module carrier composed of organosheet extend for example over approximately 30% or more of the area of the door module carrier.

As an example, the organosheet may thus extend over more than 30%, such as, over more than 40%, and generally over at least 50% of the area of the door module carrier, and therefore the organosheet thus also forms a corresponding proportion of more than 30%, such as, more than 40%, or approximately 50% or more of the surface of the door module carrier in the main plane defined by the door module carrier. In order to fully utilize the strength advantages of the organosheet, attempts are generally made to maximize the proportion of the organosheet on the area of the door module carrier. A multi-part configuration of the organosheet on a door module carrier is not ruled out here.

A main constituent part of the door module carrier is for example a plate-like semifinished product composed of an organosheet. The organosheet thus defines a substantial areal extent of the door module carrier, but may also be supplemented by further component parts or materials. By way of example, it is thus possible for metallic elements and/or plastics elements to be incorporated in the organosheet or attached to the organosheet.

In the context of one embodiment variant of the proposed solution, the sill section of the first frame component is not reinforced by the second frame component defining the window frame reinforcement. The second frame component fixed to the first frame component is thus not of continuous form for example in the region of the sill section, and is substantially U-shaped. Compared with a second frame component which also extends along the sill section, this leads to weight and cost advantages.

By way of example, in the sill section of the first frame component extends between two mutually opposite flange sections of the second frame component, which are connected to one another on the second frame component only by a window frame reinforcement of the second frame component, the window frame reinforcement reinforcing the window frame. The two mutually opposite flange sections (on the right and left in a side view of the vehicle door assembly) are consequently connected to one another only by the window frame reinforcement of the second frame component extending above the sill section, but not in the sill region of the vehicle door.

In one embodiment variant, the flange sections of the second frame component in each case do not extend beyond a transition region of the first frame component, via which one of the two lateral frame sections transitions into the sill section. The respective flange section is fixed, for example screwed at one or more points, to the first frame component over a corresponding assigned transition region. However, a continuous extension of the second frame component beyond the flange section along the sill section is not provided.

The stiffening structure of the door module carrier is formed for example with a plurality of stiffening ribs. A corresponding stiffening structure, which is injection-molded on the organosheet of the door module carrier, may thus have a plurality of reinforcing ribs extending in different spatial directions in order to stiffen specifically that edge section of the door module carrier which is close to the sill for the absorption of loads and to be able to provide the door module carrier as a load-bearing structural component. In this embodiment, the stiffening structure is provided, for example, in a narrow-strip region close to an upper edge of the door module carrier (with respect to the properly assembled orientation). This narrow-strip region in which the stiffening structure is formed runs, for example, with a width of about 2 to 10 cm, such as 5 to 10 cm, along the upper edge of the door module carrier.

In one embodiment variant, at least one edge of the door module carrier, the edge lying opposite the sill section of the first frame component, is formed partially or completely by material injection-molded on the organosheet. For example, a continuous edge web is formed by material which has been applied by injection-molding, on which edge web a seal is provided for sealing purposes in the region of the sill section.

The stiffening structure may also form at least one fastening point by which the edge section of the door module carrier is fixed to the sill section of the first frame component. In the stiffening structure which has been applied by injection-molding, for example at least one passage opening is thus formed, for example in at least one screw dome on which a screw connection of the door module carrier to the sill section of the first frame component is provided. One or more stiffening ribs of the stiffening structure may additionally be formed on a corresponding screw dome.

As an example, with a view to the configuration of the door module carrier in the form of a load-bearing, large-area structural component within the vehicle door, in one embodiment variant, a longitudinally extended guide rail of a window regulator is provided on the door module carrier and lies completely within the frame cutout of the first frame component. In the longitudinal extension direction of the guide rail, there is consequently no protrusion provided with which the guide rail projects beyond an edge of the door module carrier. By configuring the door module carrier in the form of a load-bearing structural component, it is in fact possible for the door module carrier to be designed with such a large area that a guide rail provided thereon may be completely accommodated on the door module carrier without restricting the stroke to be realized thereby for the window pane to be adjusted. This also facilitates the assembly of the door module carrier, which has already been provided with at least one guide rail, on the first frame component, since this is possible without any tilting of the door module carrier and the guide rail may be guided through the frame cutout perpendicular to the longitudinal extent of the guide rail.

For additional functional integration in the door module carrier, at least one component part of a window regulator may be injection-molded on the organosheet of the door module carrier. For example, at least one guide rail of the window regulator is injection-molded on the organosheet. The guide rail is consequently formed by material injection-molded on the organosheet and is thus an integral constituent part of the door module carrier.

The stiffening structure and the at least one component part, which is injection-molded on the organosheet, of the window regulator may also be composed of the same material.

In principle, the organosheet of the door module carrier may be composed of a fiber-reinforced plastics material, such as a glass-fiber-reinforced plastics material, for example fiber-reinforced polypropylene. Woven fiber fabric or laid fiber scrims, for example, are embedded in the corresponding plastics material. In one embodiment variant, the organosheet of the door module carrier is composed of a fiber-reinforced thermoset material.

For additional stiffening of the door module carrier, in one embodiment variant, at least one tape of bidirectionally oriented reinforcing fibers is for example provided on the door module carrier. In order to increase the stiffness of the door module carrier at least locally, for example an additional tape with bidirectionally oriented reinforcing fibers is thus applied. A targeted reinforcement of the door module carrier is then achieved by additional application of a corresponding tape to the load paths along which forces during operation of the vehicle door propagate through the door module carrier configured in the form of a load-bearing structural component. As an example, corresponding tapes may be provided on an injection-molded organosheet door module carrier, which is formed to a substantial extent by long- or continuous-fiber-reinforced polypropylene.

The at least one tape of bidirectionally oriented reinforcing fibers may also be formed for example by a laminate.

Another embodiment relates to a door module carrier for a vehicle door, the door module carrier being formed with organosheet and forming a carrier surface. A corresponding carrier surface may be provided for example for supporting functional component parts of the vehicle door. A longitudinally extended edge section is provided on the carrier surface and is provided for fixing the door module carrier to a sill section of a frame component of the vehicle door, the sill section defining a lower edge of a window opening. The areally extended door module carrier thus forms at its upper edge—with respect to the properly assembled state—an edge section which is close to the sill and by which the door module carrier is fixed at one or more points, for example via adhesive bonding or screwing, to a sill section of a door shell.

The door module carrier formed with the organosheet is configured here in the form of a load-bearing structural component and is for this purpose
stiffened on its edge section by at least one stiffening structure injection-molded on the organosheet, and by way of its edge section is provided for reinforcing the sill section of the frame component and for absorbing loads acting on the vehicle door during the operation.

A proposed organosheet door module carrier which is configured and provided for stiffening a sill region on a vehicle door and which may thus form a load-bearing structural component within the vehicle door may be used in particular in one embodiment variant of a proposed vehicle door assembly. Accordingly, advantages and features of exemplary embodiments of a proposed vehicle door assembly explained above and below also apply to embodiment variants of a proposed door module carrier and vice versa.

BRIEF DESCRIPTION OF THE DRAWINGS

The attached figures illustrate possible embodiment variants of the proposed solution in exemplary fashion.

In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In order to at least partially close the frame cutout on the first frame component, a door module carrier formed with an organosheet is assembled below the sill section. A generic vehicle door assembly with a door module carrier is known, for example, from WO 2016/17711 A1. Here, the door module carrier is fixed to the sill section at multiple points along a longitudinal extension direction of the sill section via an edge section close to the sill. Due to the design, the door module carrier of WO 2016/177711 A1 is configured to be comparatively flexible in the region of the edge section by which the door module carrier is fixed to the sill section of the door shell. In other words, a certain degree of flexibility is introduced in a targeted manner via the organosheet on the edge section in order to facilitate the assembly of the door module carrier on the frame cutout, which in the assembled state of the vehicle door defines access to a door shaft between a door outer skin (e.g. in the form of a door outer panel) and a door inner skin (e.g. in the form of a door inner panel). In this way, the door module carrier in the region of the sill section can only partially bear the loads occurring during operation of the vehicle door, such that it continues to be necessary to provide an at least two-part structure comprising a window frame reinforcement in the region of the sill section, in particular. The door module carrier thus only makes a minor contribution to the stiffness of the vehicle door. Correspondingly, load paths for forces that occur, along which the loads occurring during operation of the vehicle door propagate, are diverted around the frame cutout.

Figure 1A:
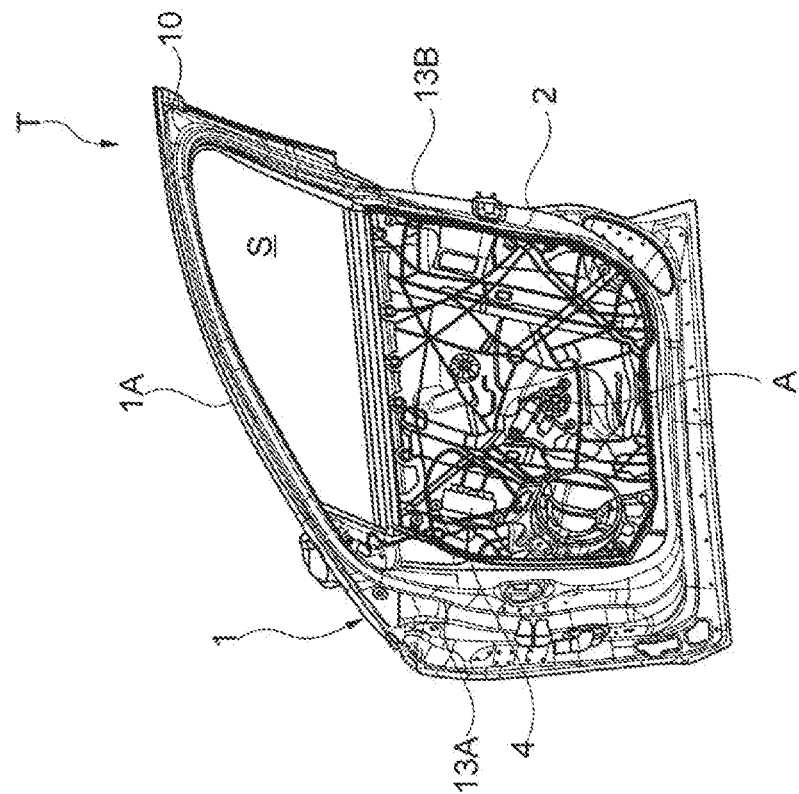
FIG. 1A shows an exploded illustration of a vehicle door assembly with a large-area organosheet door module carrier according to the proposed solution.
Figure 1B:
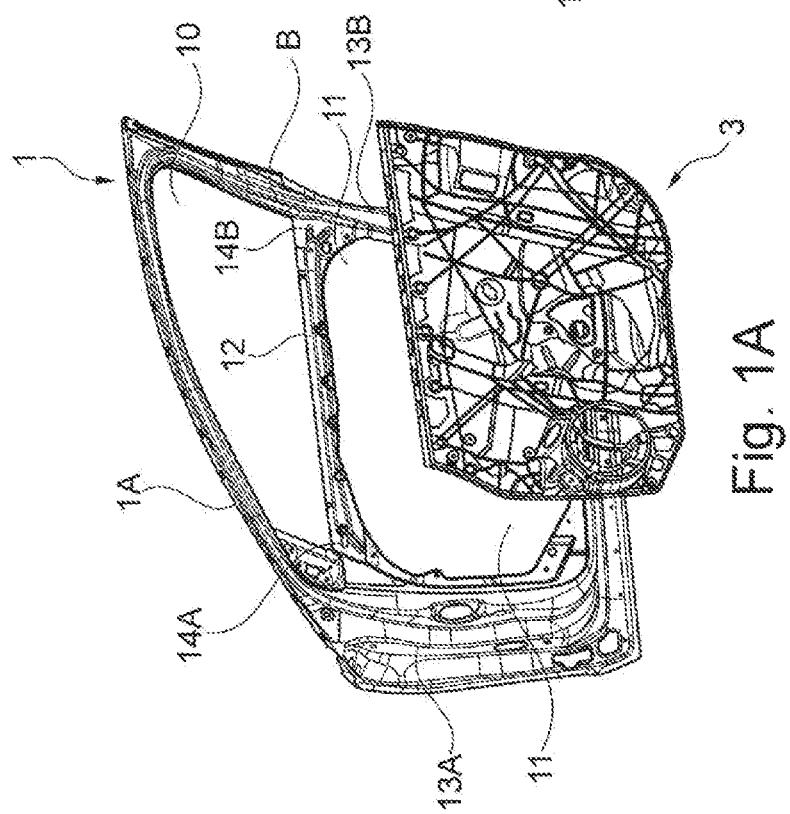
FIG. 1B shows a perspective view looking at an inner side of a vehicle door formed with the vehicle door assembly of FIG. 1A (without interior trim part or interior trim parts)
Figure 2B:
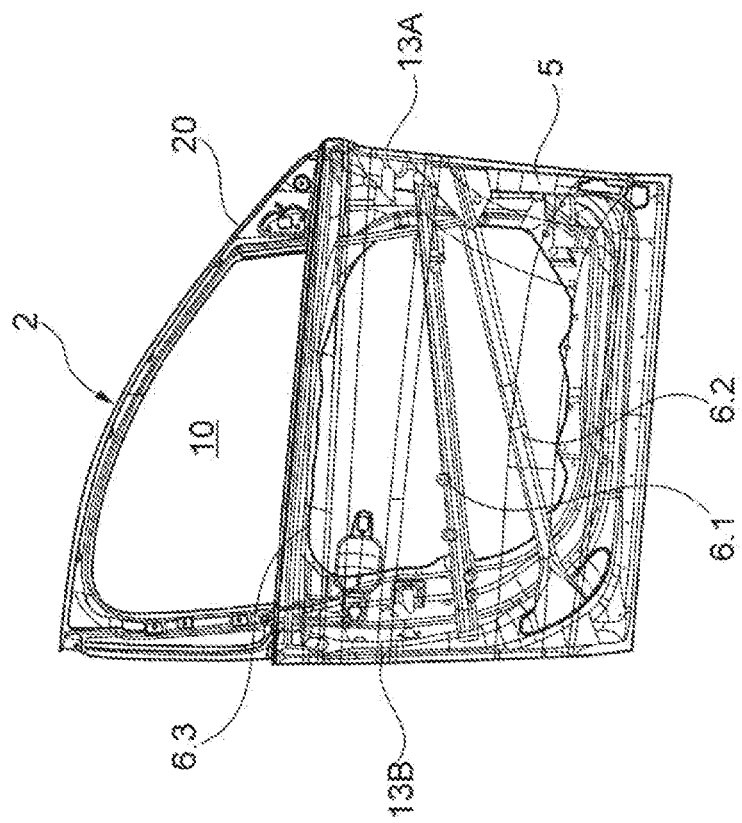
FIG. 2B shows, in a view corresponding to FIG. 2, the door shell with a door outer skin attached thereto and additional stiffening transverse struts for absorbing forces that occur as a result of a crash on the vehicle door.
Figure 2A:
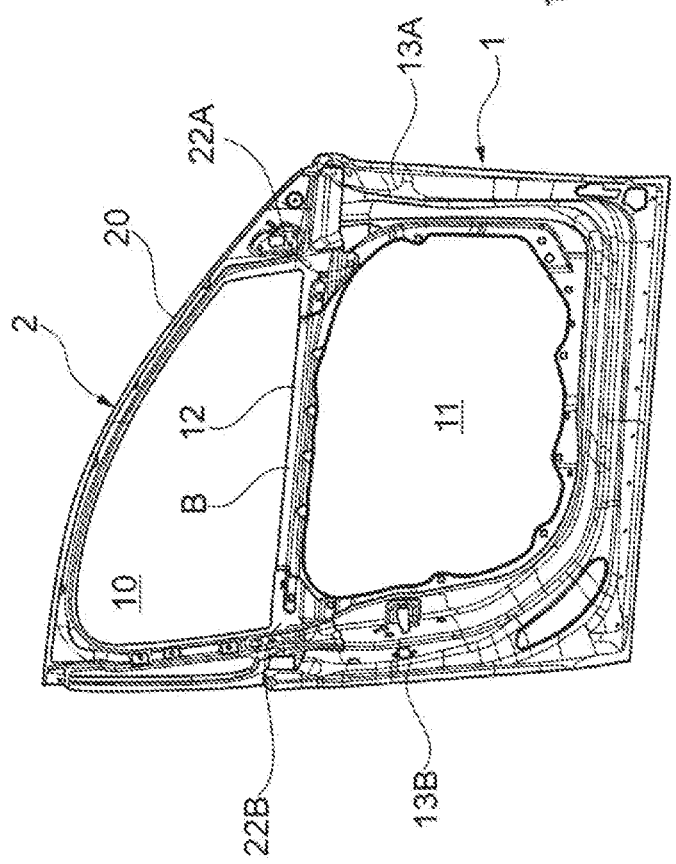
FIG. 2A shows a side view looking at an outer side of the door shell of the vehicle door assembly of FIGS. 1A and 1B, the door shell being defined by two frame parts.
Figure 3:
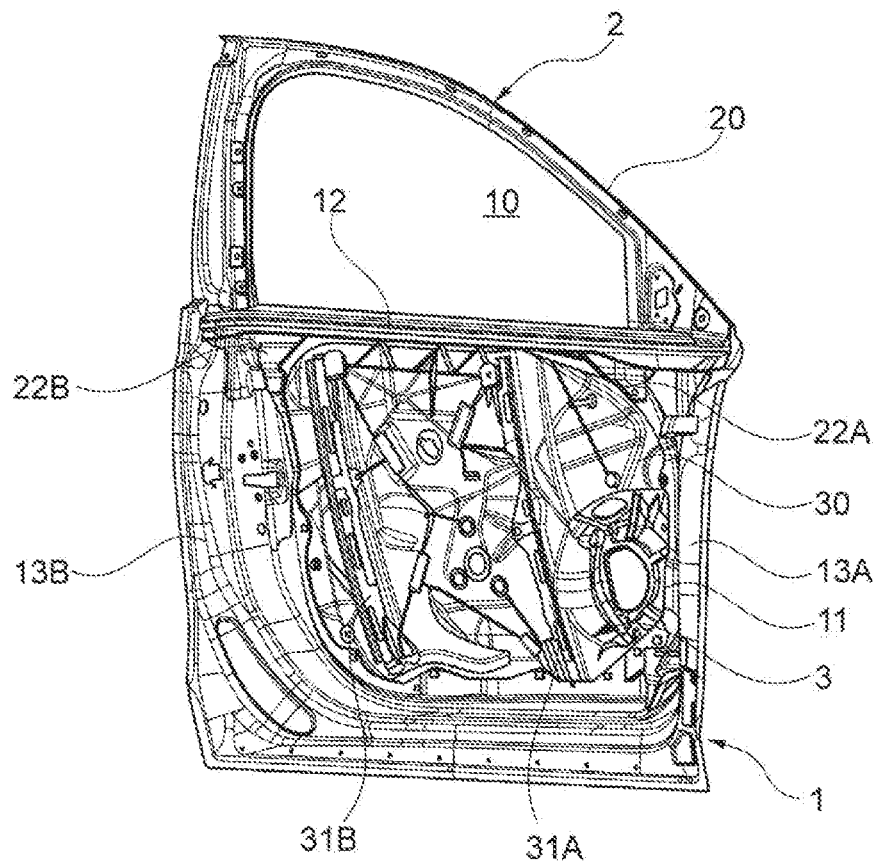
FIG. 3 shows, in a view corresponding to FIG. 2, the vehicle door assembly with the door module carrier assembled on the door shell.
Figure 4:
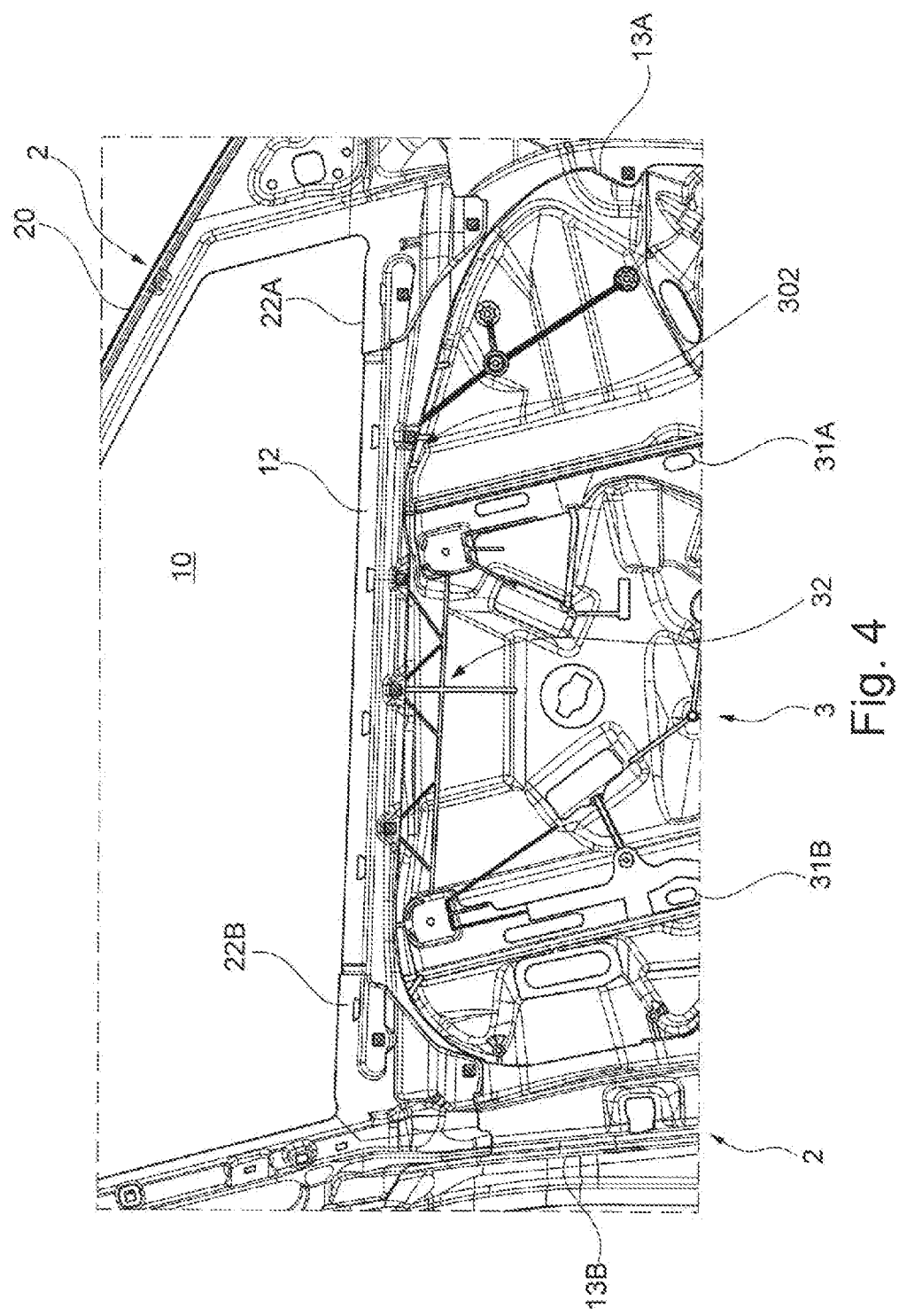
FIGS. 4 to 7 each show, on an enlarged scale, details of the vehicle door assembly corresponding to FIG. 3.
Figure 5:
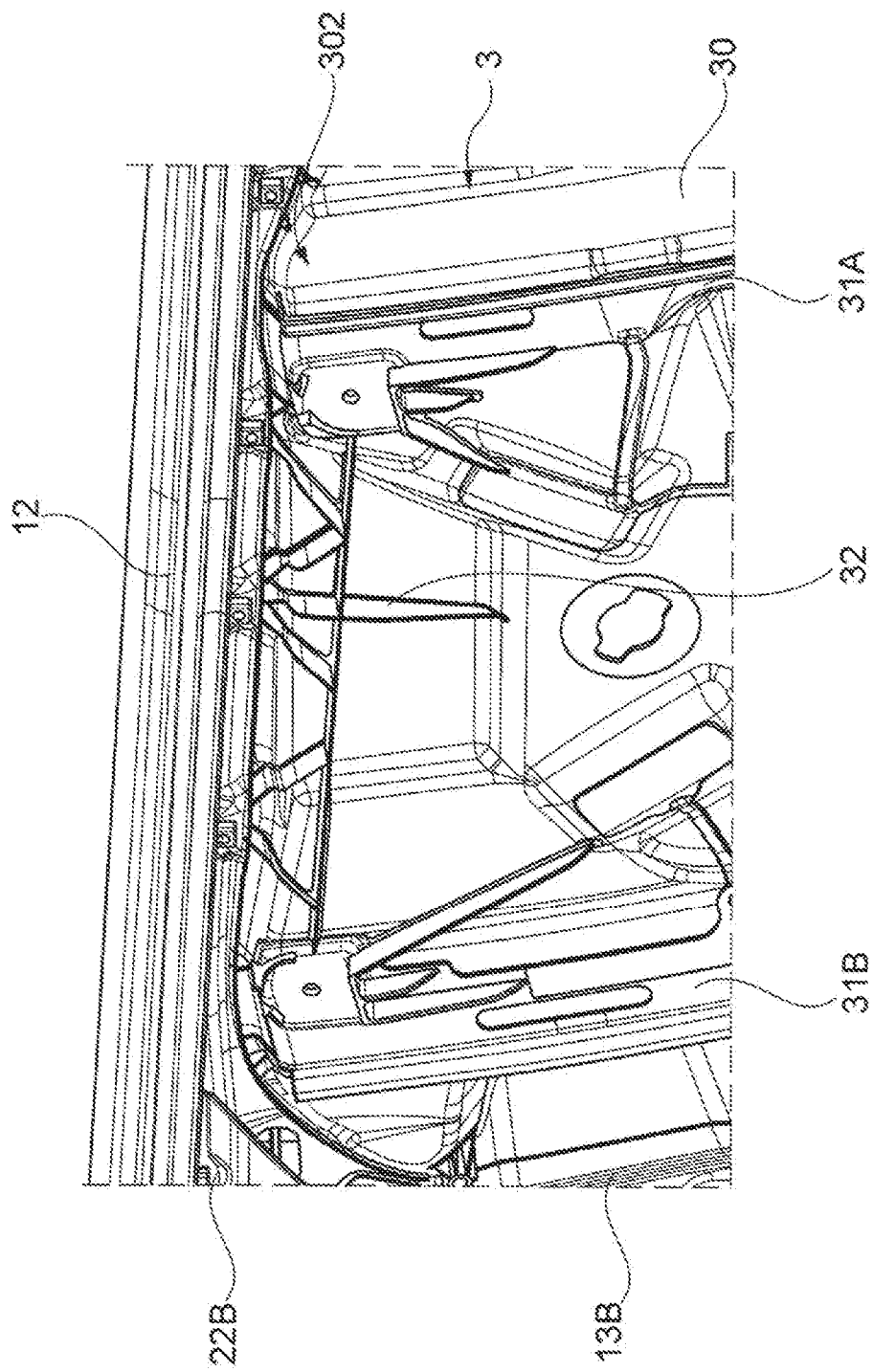
Figure 6:
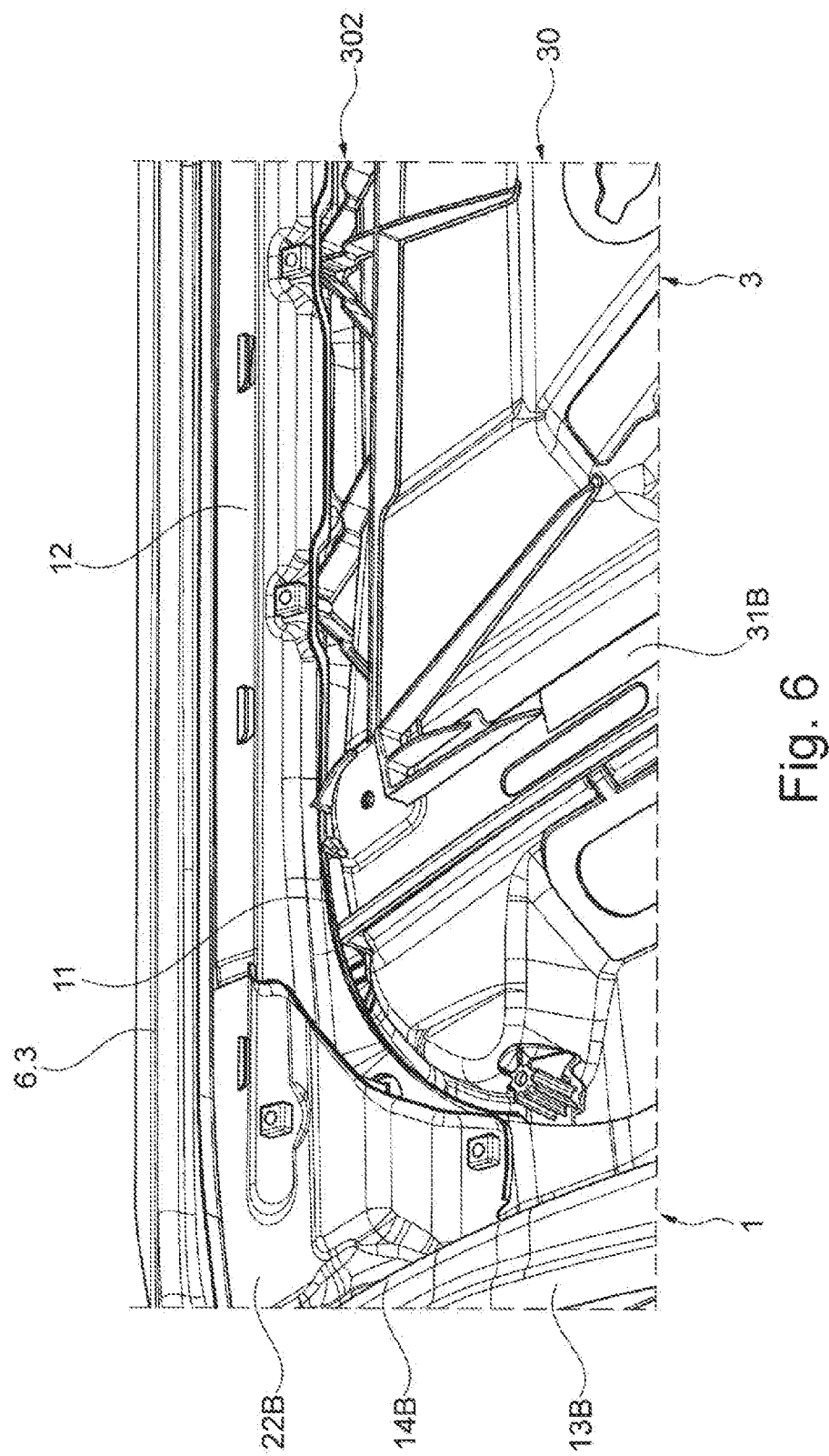
Figure 7:
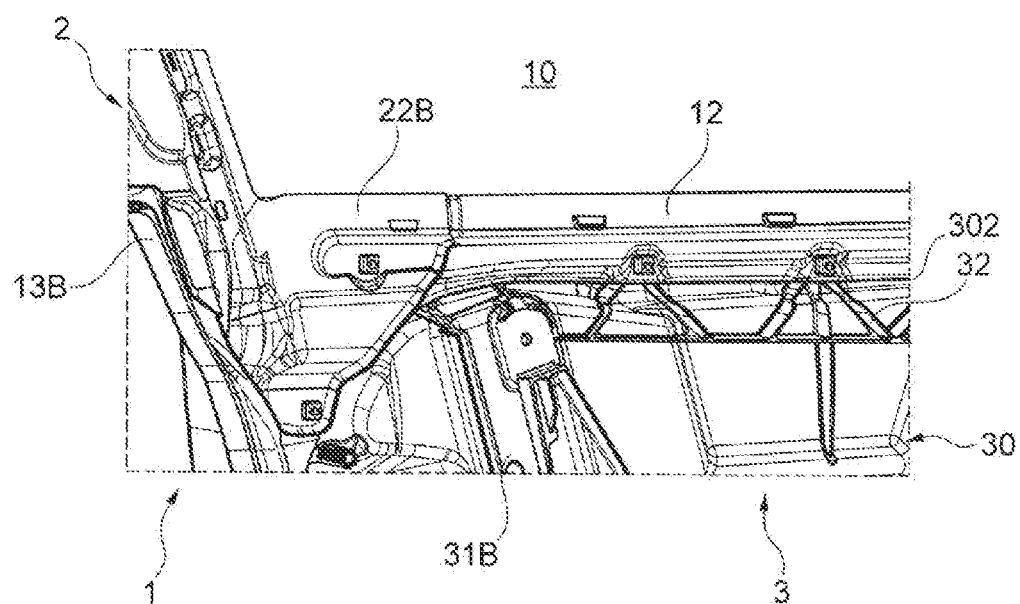
Figure 8:
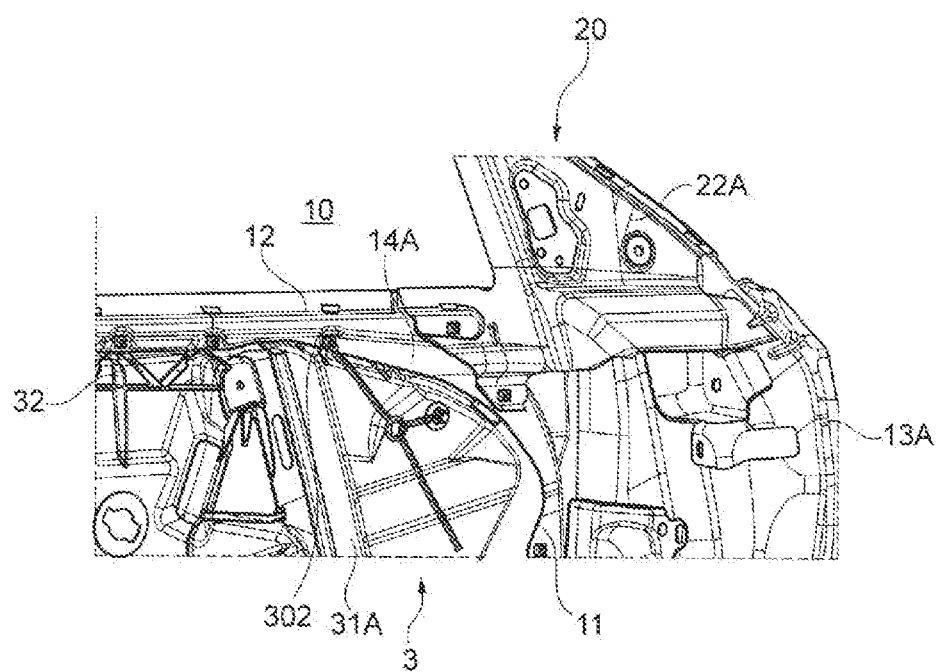
FIGS. 8 to 11 each show, on an enlarged scale, details of the door module carrier looking at a stiffened and stiffening edge section by which the door module carrier is fixed to a sill section of the door shell.
Figure 9:
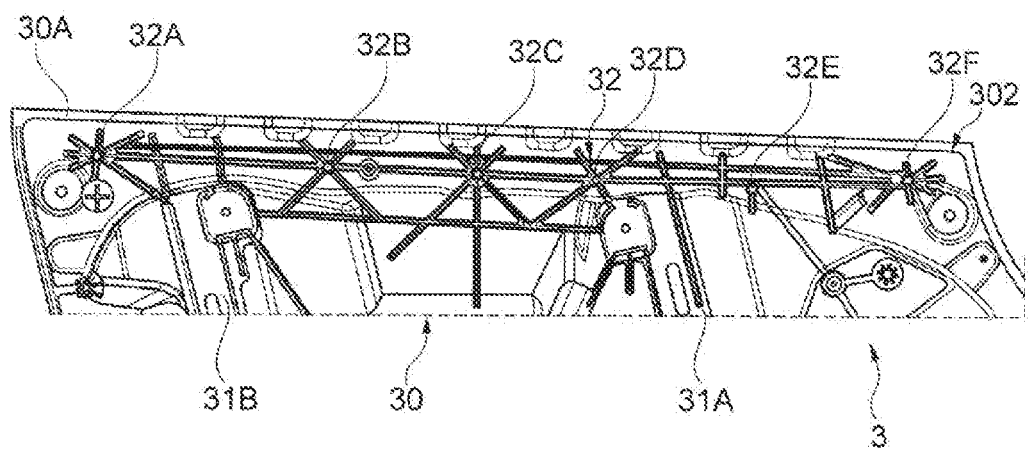
Figure 10:
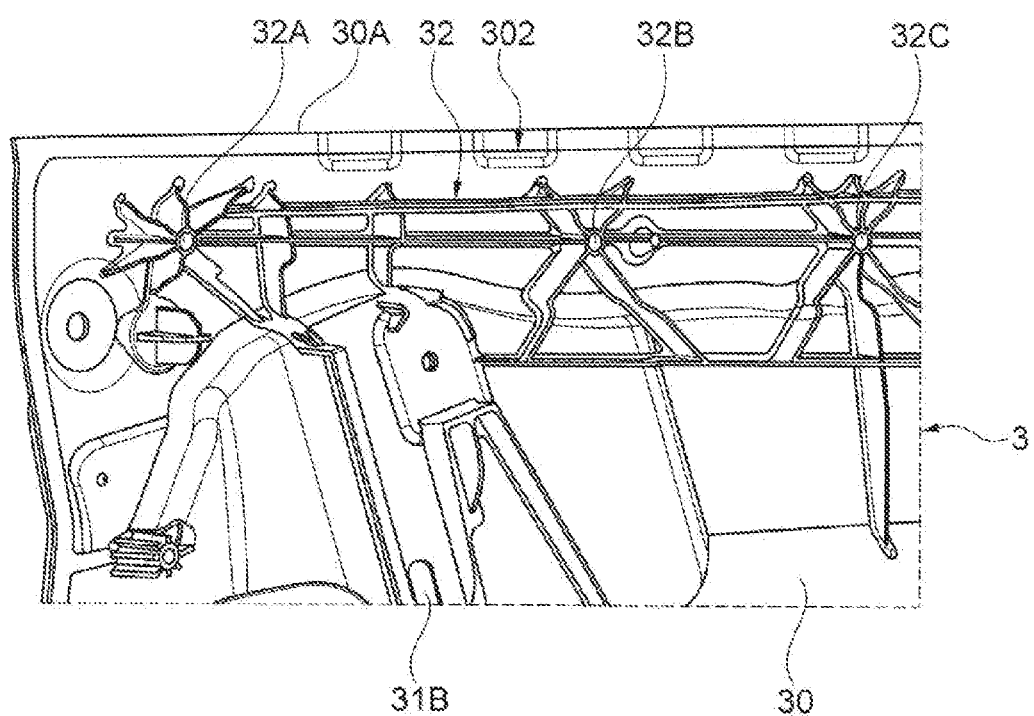
Figure 11:
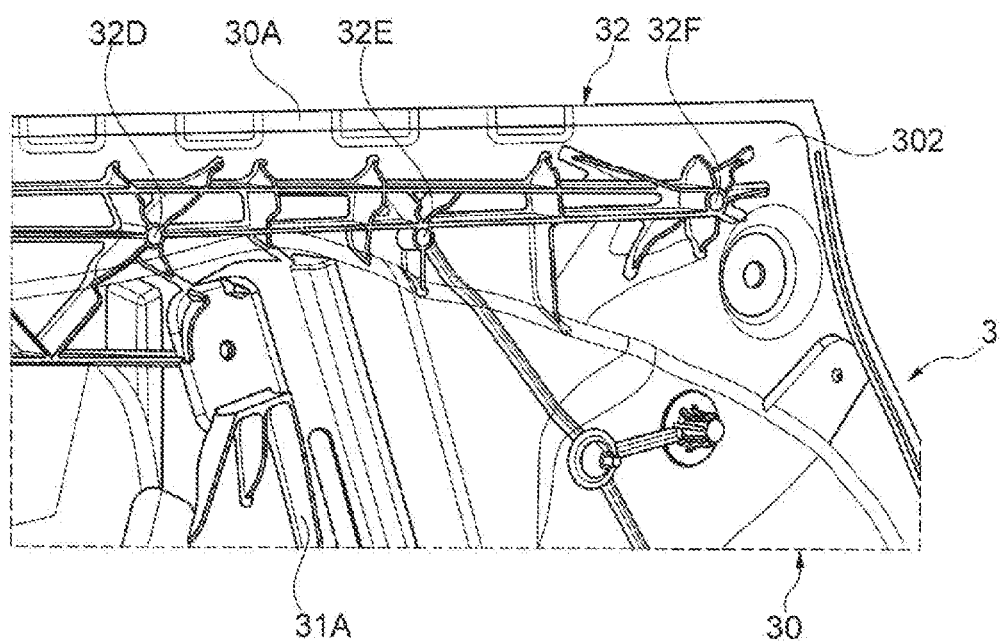

FIGS. 1A to 11 illustrate various views of one embodiment variant of a proposed vehicle door assembly. Here, a door shell is formed from a first frame component 1 and a second frame component 2 which is fixed thereto and which has a reinforcing effect. The first frame component 1 defines a window frame 1A for a window opening 10 on a vehicle door T and has two mutually opposite lateral frame sections 13A and 13B for definition of a frame cutout 11 formed below the window opening 10. In order to separate the window opening 10 from the frame cutout 11, a continuous sill section 12 is formed on the first frame component 1, the continuous sill section connecting the two lateral (right and left) frame sections 13A and 13B to one another and being used to define a sill region B on the properly assembled vehicle door T.

The comparatively large frame cutout 11 is closed by a large-area door module carrier 3. This door module carrier 3 is formed with organosheet, that is to say formed to a substantial extent by an organosheet, and configured in the form of a load-bearing structural component in the present case. For this purpose, an edge section 302 of a carrier surface 30 of the door module carrier 3 is stiffened by at least one stiffening structure 32 which is injection-molded on the organosheet and which has a plurality of stiffening ribs. Due to the load-bearing function of the door module carrier 3, no additional reinforcement by the second frame component 2 is necessary on the sill section 12 of the first frame component 1. The second frame component 2 forms merely a window frame reinforcement 20 of substantially U-shaped extent in the region of a window frame 1A of the first frame component 1. Via lateral flange sections 22A and 22B, the second frame component 2 is fixed merely in transition regions 14A and 14B of the first frame component 1, at which the lateral frame sections 13A and 13B each transition into the sill section 12.

In this case, it is not only the stiffening structure 32 with the stiffening ribs that is injection-molded on the organosheet of the door module carrier 3 but in particular also two guide rails 31A and 31B, which form component parts of a window regulator. Here, the door module carrier 3 furthermore also carries a window regulator drive A and a control unit 4 for this window regulator.

In addition, on the door module carrier 3, a continuous edge web 30A is formed in any case on the edge section 302 close to the sill by material which has been applied by injection-molding, on which edge web a seal is provided for sealing purposes in the region of the sill section 12.

The stiffening structure 32, by which the door module carrier 3 stiffens the sill section 12 in the sill region B of the vehicle door T, is formed with a plurality of screw-on points 32A to 32F. These screw-on points 32A to 32F form fastening points for the door module carrier 3 at which the door module carrier 3 is fixed to the sill section 12 of the first frame component 1. These screw-on points 32A to 32F are also formed by material injection-molded on the organosheet and are formed within the stiffening structure 32 with stiffening ribs.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE DESIGNATIONS

1 First frame component
1A Window frame
10 Window opening
11 Frame cutout
12 Sill section
13A, 13B Lateral frame section
14A, 14B Transition region
2 Second frame component/frame reinforcement
20 Window frame reinforcement
22A, 22B Lateral flange section
3 Door module carrier
30 Carrier surface
30A Edge web for seal
302 Edge section close to the sill
31A, 31B Guide rail
32 Stiffening structure
32A 32F Screw-on point
4 Control unit
5 Door outer skin
6.1, 6.2, 6.3 Transverse strut
A Window regulator drive
B Sill region
S Window pane
T Vehicle door While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle door assembly comprising:
 a first frame component including,
  a window frame defining a window opening,
  two mutually opposing lateral frame sections collectively defining a frame cutout, and
  a sill section connecting the two mutually opposing lateral frame sections to one another and separating the window opening and the frame cutout from one another;
 a second frame component configured to reinforce the window frame and fixed to the first frame component, the second frame component includes two mutually opposing flange sections and a window frame reinforcement which is configured to reinforce the window frame and extends above the sill section, wherein the two mutually opposing flange sections are connected to one another only by the window frame reinforcement; and
 a door module carrier formed with an organosheet and at least partially closing the frame cutout,
 wherein the door module carrier forms a load-bearing structural component and an edge section fixed to the sill section along a longitudinal extension direction of the sill section, and includes at least one stiffening structure injection-molded onto the organosheet and stiffening the edge section,
 wherein the edge section reinforces a continuous region of the sill section which extends between the two mutually opposing flange sections of the second frame component and in which no section of the second frame component is provided.

2. The vehicle door assembly of claim 1, wherein the sill section of the first frame component is not reinforced by the second frame component.

3. The vehicle door assembly of claim 1, wherein the first frame component includes a first transition region, in which a first lateral frame section of the two lateral frame sections transition into the sill section, wherein the two mutually opposing flange sections of the second frame component do not extend beyond the transition region.

4. The vehicle door assembly of claim 3, wherein the two mutually opposing flange sections includes a first flange section and a second flange section and the first frame component includes a second transition region, wherein the first flange section is fixed to the first transition region and the second flange section is fixed to the second transition region.

5. The vehicle door assembly of claim 1, wherein the stiffening structure is formed by a plurality of stiffening ribs.

6. The vehicle door assembly of claim 1, wherein at least one edge of the door module carrier lying opposite the sill section is formed partially or completely by material injection-molded on the organosheet.

7. The vehicle door assembly of claim 1, wherein the at least one stiffening structure forms at least one fastening point configured to fix the edge section of the door module carrier to the sill section of the first frame component.

8. The vehicle door assembly of claim 1, wherein the door module carrier includes a window regulator provided with a longitudinally extending guide rail, wherein the longitudinally extended guide rail lies completely within the frame cutout of the first frame component.

9. The vehicle door assembly of claim 8, wherein at least one component part of the window regulator is injection-molded on the organosheet.

10. The vehicle door assembly of claim 9, wherein the at least one component part is a guide rail.

11. The vehicle door assembly of claim 9, wherein the stiffening structure and the at least one component part are composed of the same material.

12. The vehicle door assembly of claim 1, wherein the organosheet of the door module carrier is composed of a fiber-reinforced thermoset material.

* * * * *